(12) United States Patent
Ju et al.

(10) Patent No.: US 11,675,504 B2
(45) Date of Patent: Jun. 13, 2023

(54) MEMORY CONTROLLER, MEMORY SYSTEM INCLUDING THE SAME, AND METHOD OF OPERATING THE SAME

(71) Applicant: SAMSUNG ELECTRONICS CO., LTD., Suwon-si (KR)

(72) Inventors: Myeongjong Ju, Seongnam-si (KR); Seungjae Lee, Seongnam-si (KR); Jisoo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/224,573

(22) Filed: Apr. 7, 2021

(65) Prior Publication Data
US 2022/0050608 A1    Feb. 17, 2022

(30) Foreign Application Priority Data
Aug. 12, 2020    (KR) .......... 10-2020-0101191

(51) Int. Cl.
*G06F 3/06*    (2006.01)
(52) U.S. Cl.
CPC .......... *G06F 3/0623* (2013.01); *G06F 3/0655* (2013.01); *G06F 3/0679* (2013.01)
(58) Field of Classification Search
CPC ............. G06F 12/1425; G06F 12/1433; G06F 12/1441; G06F 12/1458; G06F 12/1466; G06F 12/14
See application file for complete search history.

(56) References Cited

U.S. PATENT DOCUMENTS

| 7,506,367 B1 * | 3/2009 | Ishibashi ................ H04L 9/083 713/193 |
| 7,679,133 B2 | 3/2010 | Son et al. |
| 7,734,043 B1 | 6/2010 | Jefferson et al. |

(Continued)

FOREIGN PATENT DOCUMENTS

| JP | 2009-0064126 A | 3/2009 |
| KR | 10-0874872 B1 | 12/2008 |

(Continued)

OTHER PUBLICATIONS

European Office action dated Nov. 12, 2021.

*Primary Examiner* — Yaima Rigol
(74) *Attorney, Agent, or Firm* — Lee IP Law, P.C.

(57) ABSTRACT

A memory controller includes a key generator, an encryption and decryption circuit, and a processor. The key generator generates a first security key and a second security key based on a write request from a host. The encryption and decryption circuit encrypts write data corresponding to the write request based on the first security key to generate encrypted write data, and encrypts the first security key based on the second security key to generate a first encrypted security key. The processor controls nonvolatile memories such that the encrypted write data, the first encrypted security key, and the second security key are programmed in at least one of the nonvolatile memories, and controls the nonvolatile memories such that a dummy program operation is performed on a page of the nonvolatile memories in which the second security key is programmed instead of erasing the encrypted write data.

15 Claims, 16 Drawing Sheets

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,654,587 B2 | 2/2014 | Yoon et al. |
| 9,069,978 B2 | 6/2015 | Yuan |
| 9,268,961 B2 | 2/2016 | Okamoto |
| 9,749,132 B1 | 8/2017 | Hamilton |
| 2009/0052670 A1* | 2/2009 | You ................. G11B 20/00492 380/277 |
| 2009/0196418 A1* | 8/2009 | Tkacik ................. H04L 9/0894 380/46 |
| 2009/0271638 A1* | 10/2009 | Kawakami ............ H04L 9/0891 713/193 |
| 2010/0049906 A1* | 2/2010 | Tao ......................... G06F 21/79 713/193 |
| 2011/0233648 A1 | 9/2011 | Seol et al. |
| 2014/0181532 A1* | 6/2014 | Camp ..................... G06F 21/79 713/190 |
| 2015/0154121 A1* | 6/2015 | Schmier ................. G06F 21/60 713/193 |
| 2017/0039397 A1 | 2/2017 | Furuhashi et al. |
| 2017/0169883 A1 | 6/2017 | Kwon et al. |
| 2019/0132125 A1 | 5/2019 | Arroyo et al. |
| 2019/0158281 A1 | 5/2019 | Han |
| 2019/0199520 A1 | 6/2019 | Kim et al. |
| 2019/0361605 A1* | 11/2019 | Kanno ..................... G06F 3/062 |
| 2019/0362081 A1* | 11/2019 | Kanno ................... G06F 3/0679 |

FOREIGN PATENT DOCUMENTS

| | | |
|---|---|---|
| KR | 10-1105384 B1 | 1/2012 |
| KR | 10-1231592 B1 | 2/2013 |
| KR | 10-1859606 B1 | 5/2018 |

\* cited by examiner

FIG. 13

| HOST(100) | MEMORY CONTROLLER(410) |
|---|---|
| WREQ | PCMD |
| RREQ | RCMD |
| EREQ | PCMD |
| KSREQ | RCMD, PCMD |

MEMORY CONTROLLER, MEMORY SYSTEM INCLUDING THE SAME, AND METHOD OF OPERATING THE SAME

CROSS-REFERENCE TO RELATED APPLICATION

Korean Patent Application No. 10-2020-0101191, filed on Aug. 12, 2020, in the Korean Intellectual Property Office, and entitled: "Memory Controller, Memory System Including the Same, and Method of Operating the Same," is incorporated by reference herein in its entirety.

BACKGROUND

1. Field

Example embodiments relate generally to semiconductor integrated circuits, and more particularly to a memory controller, a memory system including the memory controller, and a method of operating the memory system.

2. Description of the Related Art

Memory systems including nonvolatile memories are widely used. For example, the memory systems may include a solid state drive (SSD), a nonvolatile memory express (NVMe), an embedded multimedia card (eMMC), and a universal flash storage (UFS).

SUMMARY

Embodiments are directed to a memory controller that includes a key generator, an encryption and decryption circuit and a processor. The key generator generates a first security key and a second security key based on a write request from a host. The encryption and decryption circuit encrypts write data corresponding to the write request based on the first security key to generate encrypted write data, and encrypts the first security key based on the second security key to generate a first encrypted security key. The processor controls a plurality of nonvolatile memories such that the encrypted write data, the first encrypted security key and the second security key are programmed in at least one of the plurality of nonvolatile memories, and based on an erase request for the encrypted write data from the host, controls the plurality of nonvolatile memories such that a dummy program operation is performed on a page of the plurality of nonvolatile memories in which the second security key is programmed instead of erasing the encrypted write data.

Embodiments are also directed to a memory device that includes a plurality of nonvolatile memories and a memory controller. The plurality of nonvolatile memories includes a plurality of memory blocks. The memory controller controls operations of the plurality of nonvolatile memories. The memory controller includes a key generator, an encryption and decryption circuit and a processor. The key generator generates a first security key and a second security key based on a write request from a host. The encryption and decryption circuit encrypts write data corresponding to the write request based on the first security key to generate encrypted write data, and encrypts the first security key based on the second security key to generate a first encrypted security key. The processor controls a plurality of nonvolatile memories such that the encrypted write data, the first encrypted security key and the second security key are programmed in at least one of the plurality of nonvolatile memories, and based on an erase request for the encrypted write data from the host, controls the plurality of nonvolatile memories such that a dummy program operation is performed on a page of the plurality of nonvolatile memories in which the second security key is programmed instead of erasing the encrypted write data.

Embodiments are also directed to a method of operating a memory system including a memory controller and a plurality of nonvolatile memories. A write request is received by the memory controller from a host. A first security key and a second security key are generated by the memory controller. Write data corresponding to the write request is encrypted by the memory controller based on the first security key to generate encrypted write data. The first security key is encrypted by the memory controller based on the second security key to generate a first encrypted security key. The encrypted write data is programmed in the plurality of nonvolatile memories. The first encrypted security key and the second security key are programmed in at least one of the plurality of nonvolatile memories. A dummy program operation is performed on a page of the plurality of nonvolatile memories in which the second security key is programmed instead of erasing the encrypted write data.

BRIEF DESCRIPTION OF THE DRAWINGS

Features will become apparent to those of skill in the art by describing in detail example embodiments with reference to the attached drawings in which:

FIG. 13. is a diagram for describing commands generated by a memory controller of FIG. 1 in response to requests from a host illustrated in FIG. 1.

DETAILED DESCRIPTION

Figure 1:
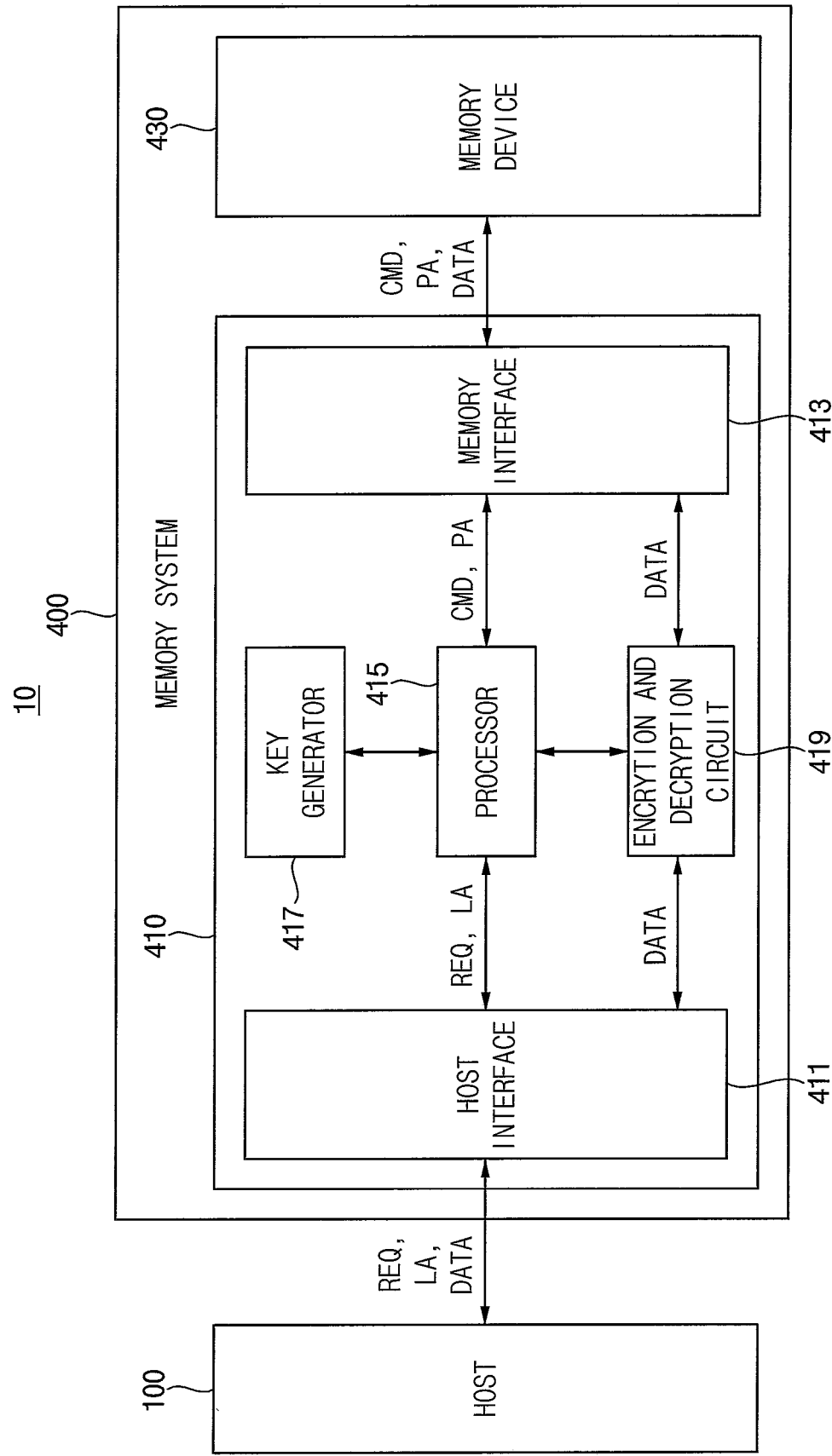
FIG. 1 is a block diagram illustrating a memory device according to example embodiments.

FIG. 1 is a block diagram illustrating a system including a memory system according to example embodiments.

Referring to FIG. 1, a system 10 may include a host 100 and a memory system 400. The memory system 400 may include a memory controller 410 and a memory device 430. The memory system 400 may perform a program process, a read process, and an erase process. In some example embodiments, the memory system 400 may perform a key switching (or key changing) process.

The host 100 may transmit requests REQ, logical addresses LA, and data DATA corresponding to the requests REQ to the memory system 400. The requests REQ may include a write request, a read request, and an erase request, for example. In some example embodiments, the request REQ may further include a key switching request.

The write request is a request to write the data DATA in the memory system 400 during the program process, and the read request is a request to read data DATA stored in the memory system 400 during the read process. The erase request is a request to erase the data DATA stored in the memory system 400 during the erase process. In some example embodiments, the key switching request may be a request to change or erase all or a portion of security keys used in an encryption process when encryption of the data DATA is performed to enhance a security of the data DATA stored in the memory system 400 during the program process.

The memory controller 410 may receive the requests REQ and the logical addresses LA corresponding to the requests REQ from the host 100, and generate commands CMD and physical addresses PA corresponding to the requests REQ and the logical addresses LA, respectively, and provide the commands CMD and the physical addresses PA to the memory device 430. In the program process, the read process, the erase process, and the key switching process, the memory controller 410 may receive the data DATA from the host 100 and provide the data DATA to the memory device 430, or receive the data DATA from the memory device 430 and provide the data to the host 100.

The memory controller 410 may include a processor 415, a key generator 417, an encryption and decryption circuit 419, a host interface 411, and a memory interface 413. The processor 415 may provide overall control of the components (the host interface 411, the memory interface 413, the key generator 417, and the encryption and decryption circuit 419) included in the memory controller 410. In some example embodiments, the processor 415 may receive requests REQ and logical addresses LA corresponding to the requests REQ from the host 100 through the host interface 411. The processor 415 may generate the commands CMD and the physical addresses PA corresponding to the requests REQ and the logical addresses LA, respectively, and provide the commands CMD and the physical addresses PA to the memory device 430 through the memory interface 413.

The key generator 417 may generate a security key under a control of the processor 415. In some example embodiments, key generator 417 may generate multiple security keys. For example, the key generator 417 may generate a first security key and a second security key, the first security key may be used to encrypt and decrypt data provided from the host 100 or the memory device 430, and the second security key may be used to encrypt the first security key.

The encryption and decryption circuit 419 may encrypt the data DATA or the security keys under a control of the processor 415, or decrypt encrypted data DATA or encrypted security keys.

The memory device 430 may receive the commands CMD and the physical addresses PA from the memory controller 410, and store the data DATA or provide the data DATA to the memory controller 410. In some example embodiments, the memory device 430 may be implemented as a solid state drive (SSD), a non-volatile memory express (NVMe), an embedded multimedia card (eMMC), a universal flash storage (UFS), or the like, for example.

Figure 2:
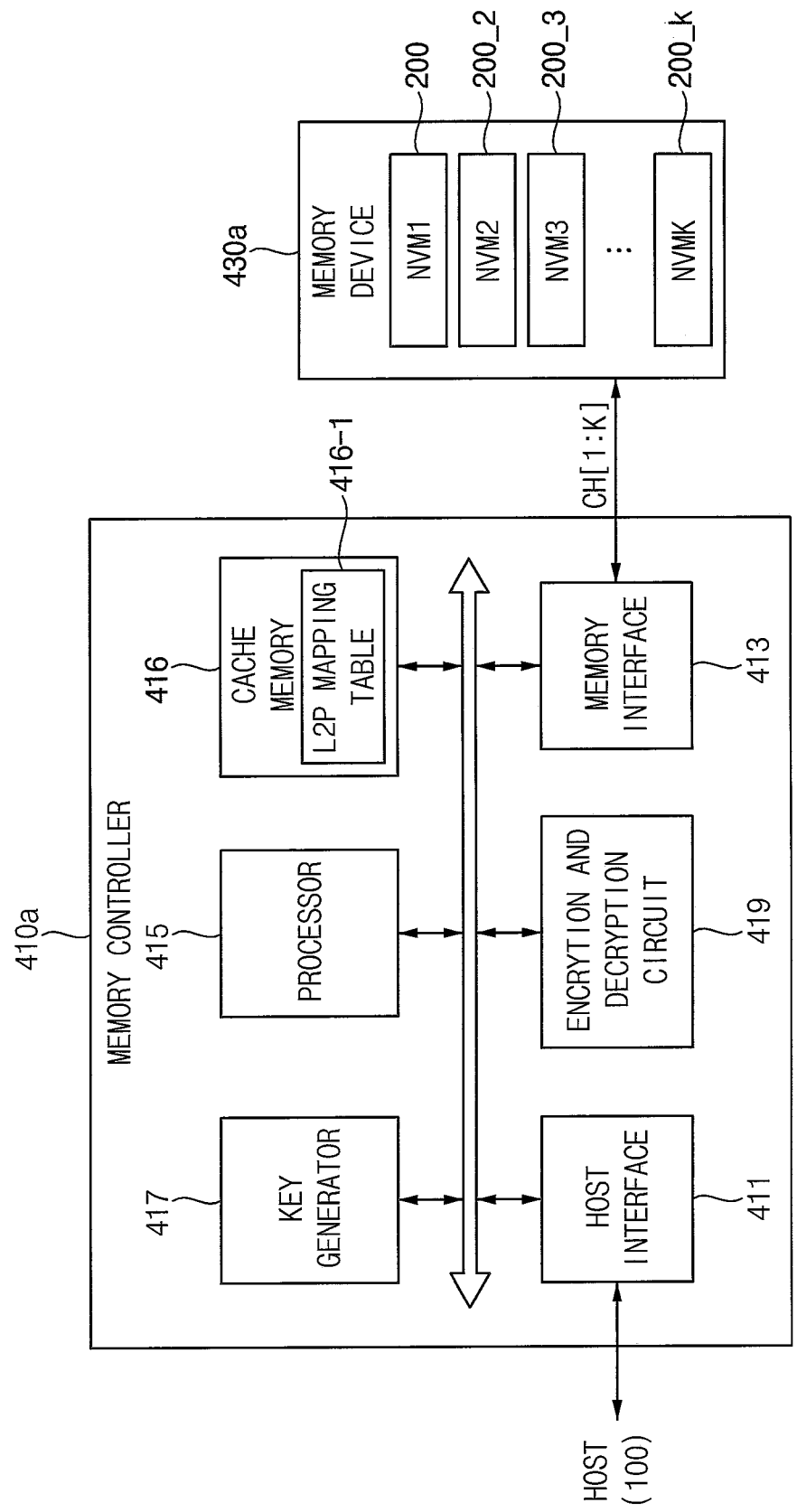
FIG. 2 is a block diagram illustrating an example embodiment of a memory controller and a memory device of FIG. 1.

FIG. 2 is a block diagram illustrating an example embodiment of a memory controller and a memory device of FIG. 1.

Referring to FIG. 2, a memory controller 410a may include the host interface 411, the memory interface 413, the processor 415, a cache memory 416, the key generator 417, and the encryption and decryption circuit 419. Redundant descriptions of components having the same reference numerals as components illustrated in FIG. 1 will be omitted.

The memory controller 410a illustrated in FIG. 2 further includes the cache memory 416 compared to the memory controller 410 illustrated in FIG. 1. The cache memory 416 may include an address mapping table (L2P (logical-to-physical) MAPPING TABLE) 416-1.

The processor 415 may receive logical addresses LA corresponding to the requests from the host 100, and generate physical addresses PA corresponding to the logical addresses LA. The processor 415 may generate information representing a correspondence relationship between the logical addresses LA and the physical addresses PA, and store the information in the address mapping table 416-1 (L2P (logical-to-physical) MAPPING TABLE). Further, the processor 415 may store information in the address mapping table 416-1 that represents whether data stored in pages of the memory device 430a corresponding to the physical addresses PA is valid.

The memory controller 410a may be connected to the memory device 430a through a plurality of channels CH[1:K]. In some example embodiments, the memory device 430 may include a first to a K-th nonvolatile memories (NVM1, NVM2, NVM3, and NVMK) 200, 200_2, 200_3, and 200_k. The first to the K-th nonvolatile memories 200, 200_2, 200_3, and 200_k may be connected to the plurality of channels CH[1:K], respectively.

Figure 3:
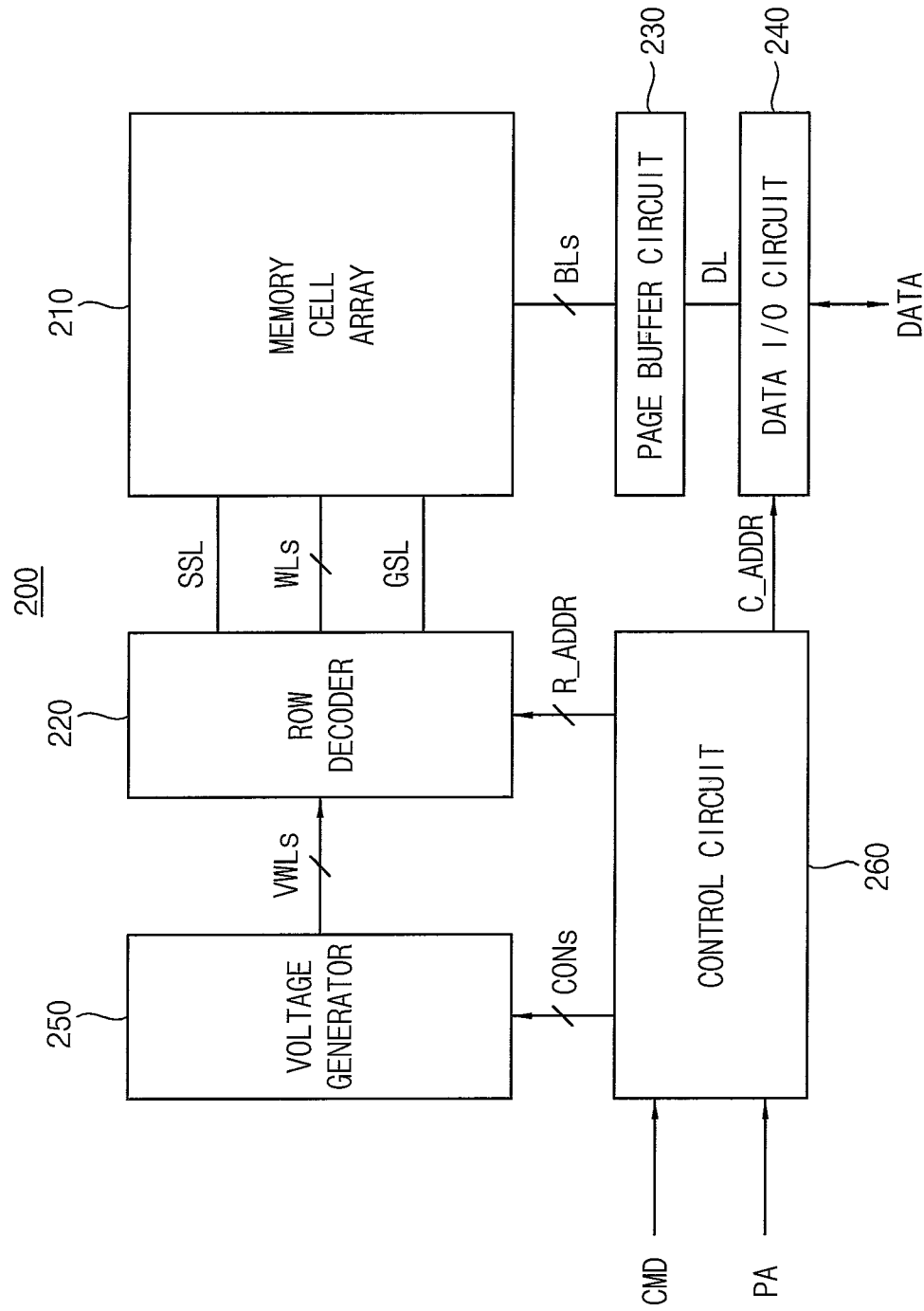
FIG. 3 is a block diagram illustrating an example embodiment of a nonvolatile memory of FIG. 2.

FIG. 3 is a block diagram illustrating an example embodiment of a nonvolatile memory of FIG. 2.

In FIG. 3, a first nonvolatile memory 200 is illustrated as an example embodiment of the first to the K-th nonvolatile memories 200, 200_2, 200_3, and 200_k of FIG. 2.

Referring to FIG. 3, the first nonvolatile memory 200 may include a memory cell array 210, a row decoder 220, a page buffer circuit 230, a data input/output (I/O) circuit 240, a voltage generator 250, and a control circuit 260.

The memory cell array 210 may be coupled to the row decoder 220 through a string selection line SSL, a plurality of word lines WLs, and a ground select line GSL. The memory cell array 210 may be further coupled to the page buffer circuit 230 through a plurality of bit lines BLs. The memory cell array 210 may be divided into the plurality of memory blocks BLK1 and BLK2, and each memory block BLK1 and BLK2 may include a plurality of nonvolatile memory cells coupled to the plurality of word lines WLs and the plurality of bit lines BLs.

In some example embodiments, the memory cell array 210 may be a two dimensional memory cell array formed in a two dimensional structure (or a horizontal structure) on a substrate. For example, the memory cell array 210 may include string select transistors SST, ground select transistors GST, and memory cells MC. The string select transistors SST may be coupled to bit lines BL(1) and BL(m), and the ground select transistors GST may be coupled to a common source line CSL. The memory cells MC in the same string may be arranged in series between a corresponding one of the bit lines BL(1) and BL(m) and the common source line CSL. The memory cells MC in the same row may be coupled to a corresponding one of word lines WL(1), WL(2), WL(3), WL(n-1), and WL(n). Thus, the memory cells MC may be coupled in series between the string select transistors SST and the ground select transistors GST, and, e.g., 16, 32, or 64 word lines WL(1) through WL(n) may be disposed between the string select line SSL and the ground select line GSL. The string select transistors SST may be coupled to the string select line SSL, and may be controlled according to a level of a voltage applied to the string select line SSL. The ground select transistors GST may be coupled to the ground select line GSL, and may be controlled according to a level of a voltage applied to the ground select line GSL. The memory cells MC may be controlled according to levels of voltages applied to the word lines WL(1) through WL(n). The first nonvolatile memory 200 including the memory cell array 210a may perform a write (or program) operation and a read operation on a page basis, and may perform an erase operation on a block basis.

In other example embodiments, the memory cell array 210 may be a three dimensional memory cell array formed in a three dimensional structure (or a vertical structure) on a substrate. The following U.S. patent documents, which are hereby incorporated by reference in their entireties, describe suitable configurations for a memory cell array including a 3D vertical array structure, in which the 3D memory array is configured as a plurality of levels, with word lines and/or bit lines shared between levels: U.S. Pat. Nos. 7,679,133, 8,553,466, 8,654,587, and 8,559,235, and U.S. Pat. Pub. No. 2011/0233648 A1.

Although examples of the memory cell arrays 210 included in the nonvolatile memory 200 according to example embodiments are described based on a NAND flash memory device, the nonvolatile memory device according to example embodiments may be any suitable nonvolatile memory device, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Referring again to FIG. 3, the control circuit 260 may receive commands CMD and physical addresses PA from the memory controller 410 and 410a in FIGS. 1 and 2, and may control the row decoder 220, the page buffer circuit 230, the data I/O circuit 240, and the voltage generator 250 based on the commands CMD and the physical addresses PA to perform write (or program), read, and erase operations for the memory cell array 210. For example, the control circuit 260 may generate control signals CONs for controlling the voltage generator 250 based on the command CMD, and may generate a row address R_ADDR and a column address C_ADDR based on the physical addresses PA. The control circuit 260 may provide the row address R_ADDR to the row decoder 220, and may provide the column address C_ADDR to the data I/O circuit 240.

The row decoder 220 may be connected to the memory cell array 210 via the string selection line SSL, the plurality of word lines WLs, and the ground selection line GSL. The row decoder 220 may determine at least one of the plurality of word lines WLs as a selected word line, and may determine the rest of the plurality of word lines WLs as unselected word lines, based on the row address R_ADDR.

The voltage generator 250 may generate word line voltages VWLs that are used for an operation of the nonvolatile memory 200 based on the control signals CONs. The word line voltages VWLs may be applied to the plurality of word lines WLs via the row decoder 220. For example, during the erase operation, the voltage generator 250 may apply an erase voltage to a well or a common source line of a memory block, and may apply a ground voltage to entire word lines of the memory block. During an erase verification operation, the voltage generator 250 may apply an erase verification voltage to all of the word lines of the memory block or sequentially apply the erase verification voltage on a word line-by-word line basis. During the program operation (or the write operation), the voltage generator 250 may apply a program voltage to the selected word line, and may apply a program pass voltage to the unselected word lines. During a program verification operation, the voltage generator 250 may apply a program verification voltage to the selected word line, and may apply a verification pass voltage to the unselected word lines. During the read operation, the voltage generator 250 may apply a read voltage to the selected word line, and may apply a read pass voltage to the unselected word lines.

The page buffer circuit 230 may be connected to the memory cell array 210 via the plurality of bit lines BLs. The page buffer circuit 230 may include a plurality of page buffers. In some example embodiments, each page buffer may be connected to one bit line. In other example embodiments, each page buffer may be connected to two or more bit lines. The page buffer circuit 230 may store data DAT to be programmed into the memory cell array 210 or may read data DAT sensed from the memory cell array 210. In other words, the page buffer circuit 230 may operate as a write driver or a sensing amplifier according to an operation mode of the nonvolatile memory 200.

The data I/O circuit 240 may be connected to the page buffer circuit 230 via a data line DL. The data I/O circuit 240 may provide the data DATA from an outside of the first nonvolatile memory 200 (e.g., from the memory controller 410 and 410a in FIGS. 1 and 2) to the memory cell array 210 via the page buffer circuit 230, or may provide the data DAT from the memory cell array 210 to the outside of the first nonvolatile memory 200, based on the column address C_ADDR.

Figure 4:
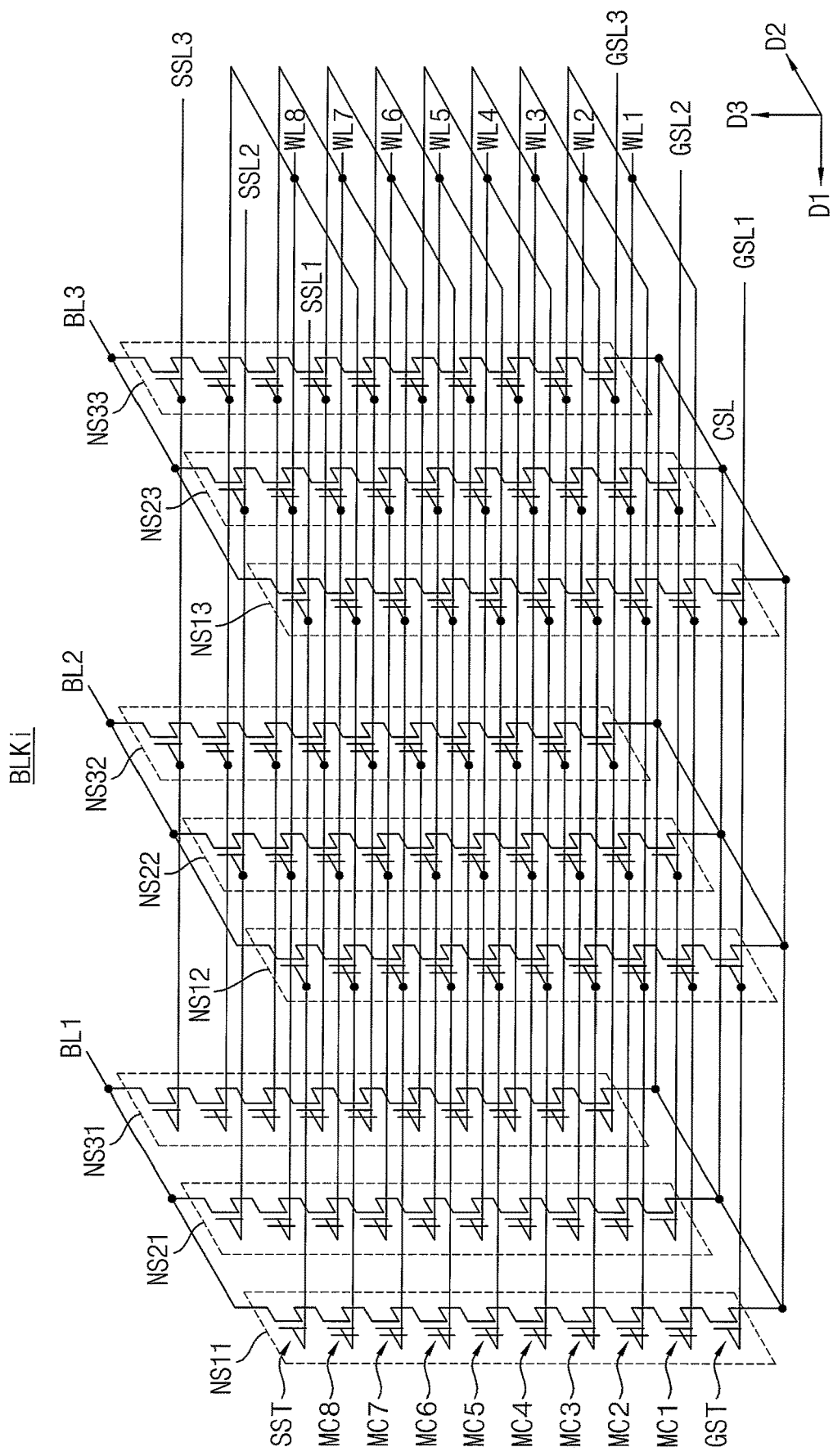
FIG. 4 is a circuit diagram illustrating an equivalent circuit of a memory block included in a memory cell array of a nonvolatile memory of FIG. 2.

FIG. 4 is a circuit diagram illustrating an equivalent circuit of a memory block included in a memory cell array of a nonvolatile memory of FIG. 2.

A memory block BLKi of FIG. 4 may be formed on a substrate in a three-dimensional structure (or a vertical structure). For example, a plurality of NAND strings included in the memory block BLKi may be formed in a direction perpendicular to the substrate.

Referring to FIG. 4, the memory block BLKi may include a plurality of NAND strings NS11, NS12, NS13, NS21, NS22, NS23, NS31, NS32, and NS33 connected between bitlines BL1, BL2, and BL3 and a common source line CSL. Each of the NAND strings NS11 to NS33 may include a string selection transistor SST, a plurality of memory cells MC1, MC2, MC3, MC4, MC5, MC6, MC7, and MC8, and a ground selection transistor GST.

Each string selection transistor SST may be connected to a corresponding string selection line (one of SSL1, SSL2, and SSL3). The plurality of memory cells MC1 to MC8 may be connected to corresponding wordlines WL1, WL2, WL3, WL4, WL5, WL6, WL7, and WL8, respectively. Each ground selection transistor GST may be connected to a corresponding ground selection line (one of GSL1, GSL2, and GSL3). Each string selection transistor SST may be connected to a corresponding bitline (e.g., one of BL1 to BL3), and each ground selection transistor GST may be connected to the common source line CSL. In the example embodiment of FIG. 4, some of the string selection transistors SST are connected to the same bitline (e.g., one of BL1 to BL3) to connect corresponding NAND strings to the same bitline via selection voltages applied to the appropriate sting selection lines SSL1 to SSL3 and ground selection lines GSL1 to GSL3.

The cell strings connected in common to one bitline may form one column, and the cell strings connected to one string selection line may form one row. For example, the cell strings NS11, NS21, and NS31 connected to the first bitline BL1 may correspond to a first column, and the cell strings NS11, NS12, and NS13 connected to the first string selection line SSL1 may form a first row.

Wordlines (e.g., WL1) having the same height may be commonly connected, and the ground selection lines GSL1 to GSL3 and the string selection lines SSL1 to SSL3 may be separated. Memory cells located at the same semiconductor layer may share a wordline. Cell strings in the same row may share a string selection line. The common source line CSL may be connected in common to all of cell strings.

In FIG. 4, the memory block BLKi is illustrated as being connected to eight wordlines WL1 to WL8 and three bitlines BL1 to BL3, and each of the NAND strings NS11 to NS33 is illustrated as including eight memory cells MC1 to MC8, but each memory block may be connected to any suitable number of wordlines and bitlines, and each NAND string may include any suitable number of memory cells.

A three-dimensional vertical array structure may include vertical NAND strings that are vertically oriented such that at least one memory cell is located over another memory cell. The at least one memory cell may include a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and U.S. Pat. Pub. No. 2011/0233648 A1.

Although the memory cell array included in the nonvolatile memory device according to example embodiments is described based on a NAND flash memory device, the nonvolatile memory device according to example embodiments may be any suitable nonvolatile memory device, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Figure 5:
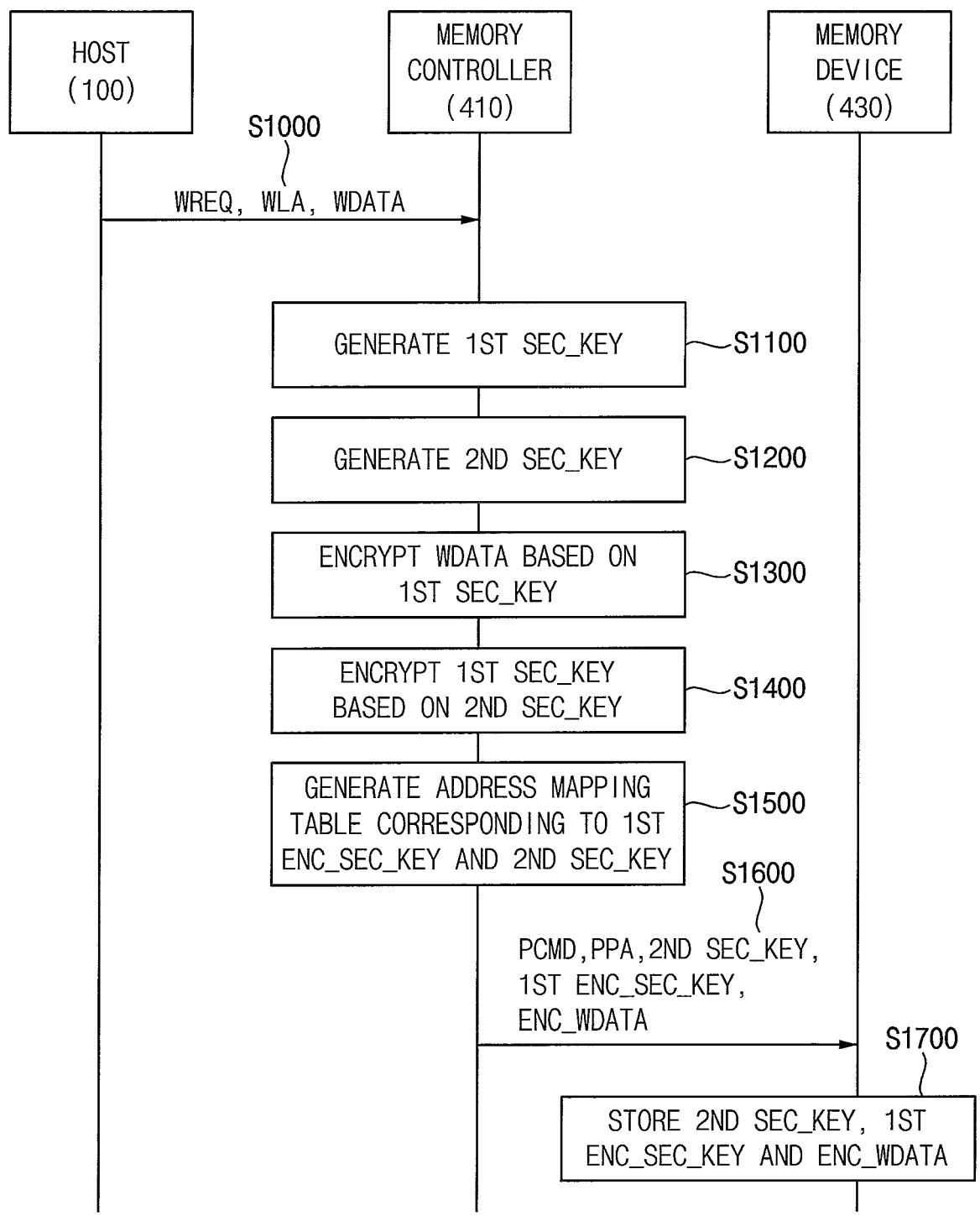
FIG. 5 is a diagram for describing a process of programming data to a nonvolatile memory illustrated in FIGS. 1 and 2.

FIG. 5 is a diagram for describing a process of programming data to a nonvolatile memory illustrated in FIGS. 1 and 2.

Referring to FIG. 5, to write data, hereinafter referred to as 'write data WDATA', in the memory device 430, the host 100 may provide a write request WREQ, a write logical address WLA corresponding to the write request WREQ, and the write data WDATA to the memory controller 410. The memory controller 410 may generate a first security key 1ST SEC_KEY (S1100) and a second security key 2ND SEC_KEY (S1200). In some example embodiments, the first security key 1ST SEC_KEY and the second security key 2ND SEC_KEY may be generated in response to the write request WREQ, but the first security key 1ST SEC_KEY and the second security key 2ND SEC_KEY may be generated before operation S1000 and stored in the cache memory 416 or the memory device 430a (e.g., nonvolatile memory) of FIG. 2, and in this case, the first security key 1ST SEC_KEY and the second security key 2ND SEC_KEY may be loaded into the processor 415 of FIG. 2 in response to the write request WREQ.

The memory controller 410 may encrypt the write data WDATA based on the first security key 1ST SEC_KEY (S1300), and encrypt the first security key 1ST SEC_KEY based on the second security key 2ND SEC_KEY (S1400). Operations S1300 and S1400 will be described in detail below in connection with FIG. 6.

Figure 6:
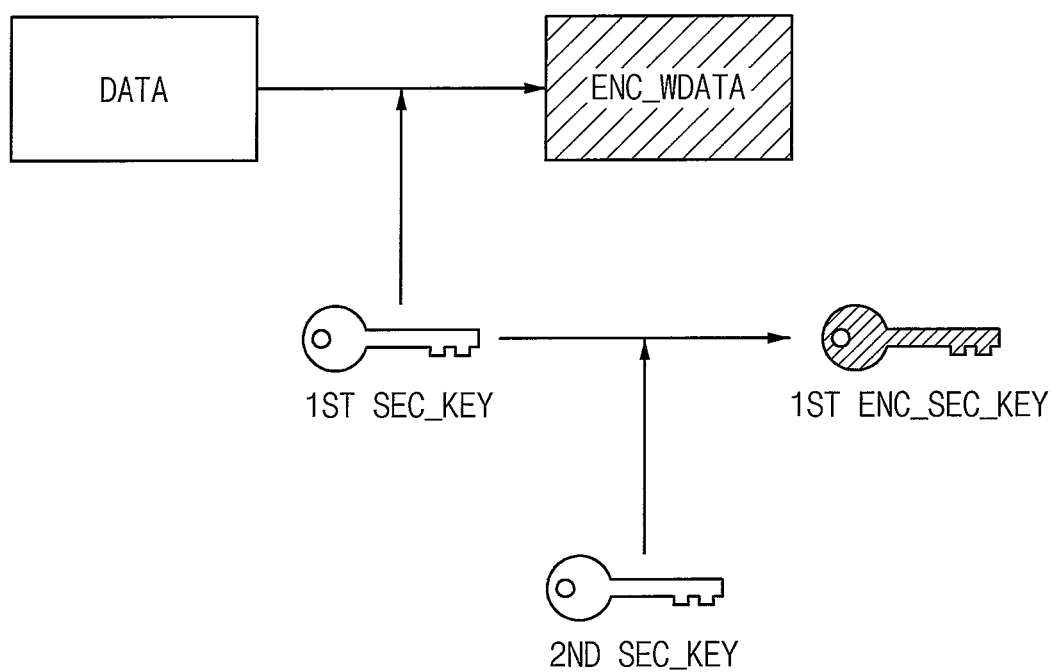
FIG. 6 is a diagram for describing a process of encrypting write data based on a first security key and encrypting the first security key based on a second security key.

FIG. 6 is a diagram for describing a process of encrypting write data based on a first security key, and encrypting the first security key based on a second security key.

In FIG. 6, write data WDATA, encrypted write data ENC_WDATA, a first security key 1ST SEC_KEY, a first encrypted security key 1ST ENC_SEC_KEY, and a second security key 2ND SEC_KEY are illustrated.

Referring to FIG. 6, the memory controller 410 may encrypt the write data WDATA to generate the encrypted write data ENC_WDATA, and encrypt the first security key 1ST SEC_KEY to generate the first encrypted security key 1ST ENC_SEC_KEY.

In some example embodiments, the first security key 1ST SEC_KEY may be referred to as a cryptographic key in that the first security key 1ST SEC_KEY encrypts the write data WDATA, and the second security key 2ND SEC_KEY may be referred to as a security key in that the second security key 2ND_SEC_KEY re-encrypts the first security key 1ST SEC_KEY already used to encrypt the write data WDATA, for example.

In some example embodiments, a plurality of first security keys 1ST SEC_KEY may be generated, and a single second security key 2ND SEC_KEY may be generated. The plurality of first security keys 1ST SEC_KEY may be used to encrypt various data additionally generated in related with the write data WDATA, in addition to encryption of the write data WDATA. In this case, the second security key 2ND SEC_KEY may be used to encrypt each of the plurality of first security keys 1ST SEC_KEY.

In some example embodiments, an encryption algorithm used in a process in which the write data WDATA and the first security key 1ST SEC_KEY are encrypted by, or using the first security key 1ST SEC_KEY and the second security key 2ND SEC_KEY, respectively, may be a symmetric key algorithm, for example. In some example embodiments, the symmetric key algorithm may be an AES (Advanced Encryption Standard) algorithm in which a length of the first security key 1ST SEC_KEY and the second security key 2ND SEC_KEY is one of 128 bits, 192 bits, and 256 bits, for example.

Referring back to FIG. 5, the memory controller 410 may generate an address mapping table corresponding to the first encrypted security key 1ST ENC_SEC_KEY and the second security key 2ND_SEC_KEY (S1500). In some example embodiments, the address mapping table may store physical addresses for each of the first encrypted security key 1ST ENC_SEC_KEY and the second security key 2ND SEC_KEY. As will be described below with reference to FIGS. 7A and 7B, the first encrypted security key 1ST ENC_SEC_KEY, the second security key 2ND SEC_KEY, and the encrypted write data ENC_WDATA may be programmed in different regions on the memory device 430. Accordingly, physical addresses of the memory device 430 corresponding to regions in which the first encrypted security key 1ST ENC_SEC_KEY and the second security key 2ND SEC_KEY are programmed may be separately managed in the address mapping table.

The memory controller 410 may generate a program command PCMD based on the write request WREQ, and generate program physical addresses PPA based on the write logical address WLA. The memory controller 410 may provide the program command PCMD, the program physical addresses PPA, the second security key 2ND SEC_KEY, the first encrypted security key, and encrypted write data ENC_WDATA to the memory device 430.

The memory device 430 may store the second security key 2ND SEC_KEY, the first encrypted security key 1ST ENC_SEC_KEY, and the encrypted write data ENC_W-DATA based on the program physical addresses PPA (S1700).

Figure 7A:
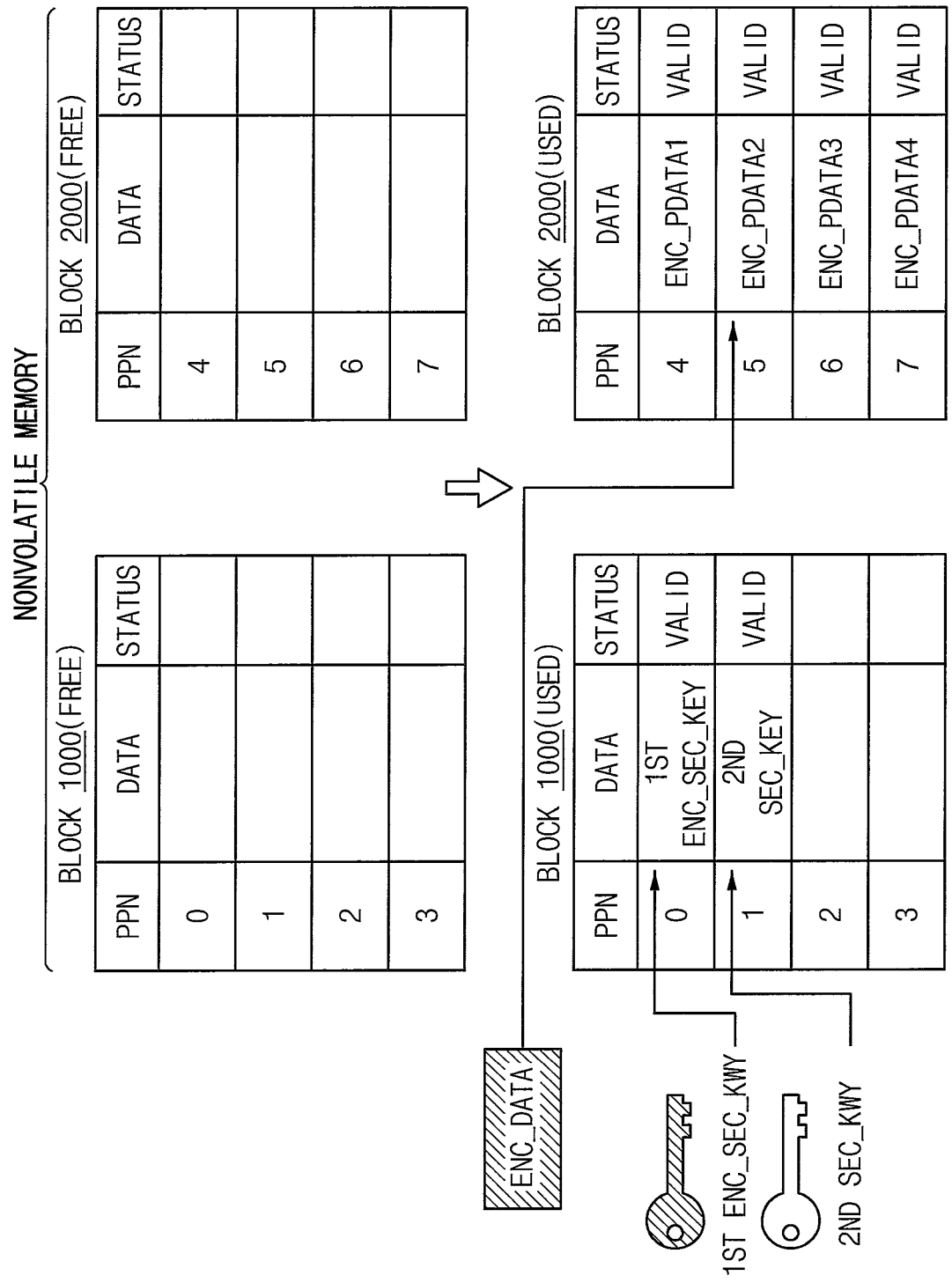
FIGS. 7A and 7B are diagrams for describing regions in which encrypted write data, a first encrypted security key and a second security key are stored in a nonvolatile memory illustrated in FIG. 1.
Figure 7B:
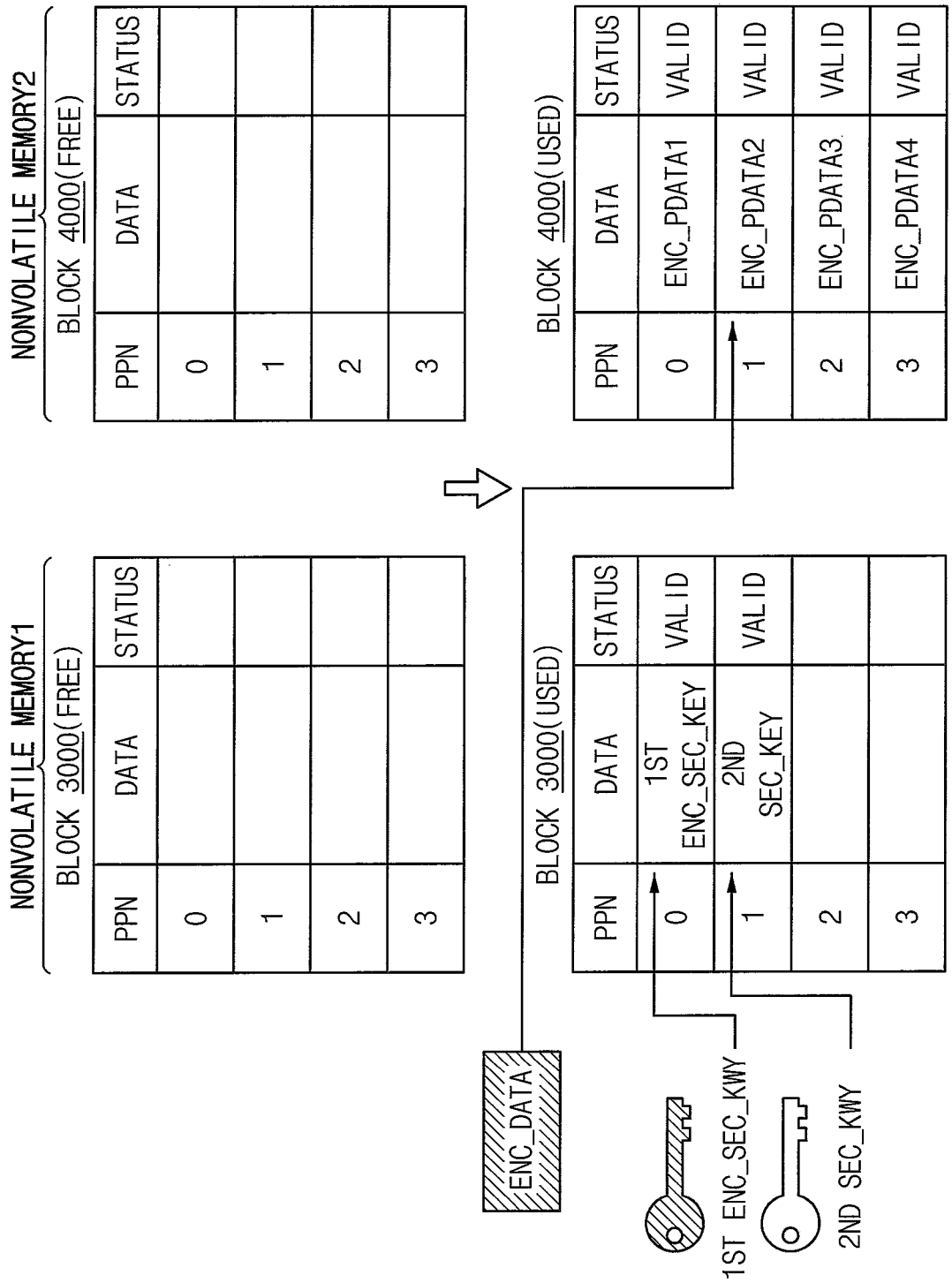

FIGS. 7A and 7B are diagrams for describing regions in which encrypted write data, a first encrypted security key, and a second security key are stored in a nonvolatile memory illustrated in FIG. 1.

In FIG. 7A, free blocks, e.g., a first block BLOCK 1000 and a second block BLOCK 2000), which are different regions of one nonvolatile memory NONVOLATILE MEMORY, are illustrated.

Referring to FIG. 7A, the first block BLOCK 1000 and the second block BLOCK 2000 may be programmed according to the program process described above with reference to FIG. 5. In some example embodiments, the first encrypted security key 1ST ENC_SEC_KEY and the second security key 2ND SEC_KEY may be programmed in the first block BLOCK 1000, and the encrypted write data ENC_WDATA may be programmed in the second block BLOCK 2000. Thus, the first encrypted security key 1ST ENC_SEC_KEY may be programmed in a first page having a physical page number (PPN, Physical Page Number) of 0 of the first block BLOCK 1000, the second security key 2ND SEC_KEY may be programmed in a second page having a PPN of 1 of the first block BLOCK 1000, and the encrypted write data ENC_WDATA may be divided (i.e., ENC_WDATA1, ENC_WDATA2, ENC_WDATA3 and ENC_WDATA4) and programmed in fifth to eighth pages having PPNs of 4 to 7 of the second block BLOCK 2000.

In FIG. 7B, free blocks, i.e., a third block BLOCK 3000 and a fourth block BLOCK 4000, which are same regions of each of different nonvolatile memories NONVOLATILE MEMORY1 and NONVOLATILE MEMORY2, are illustrated.

Referring to FIG. 7B, the third block BLOCK 3000 and the fourth block BLOCK 4000 may be programmed according to the program process described above with reference to FIG. 5. In some example embodiments, the first encrypted security key 1ST ENC_SEC_KEY and the second security key 2ND SEC_KEY may be programmed in the third block BLOCK 3000 of the nonvolatile memory NONVOLATILE MEMORY1, and the encrypted write data ENC_WDATA may be programmed in the fourth block BLOCK 4000 of the nonvolatile memory NONVOLATILE MEMORY2. Thus, the first encrypted security key 1ST ENC_SEC_KEY may be programmed in a first page having a PPN of 0 of the third block BLOCK 3000 of the nonvolatile memory NONVOLATILE MEMORY1, the second security key 2ND SEC_KEY may be programmed in a second page having a PPN of 1 of the third block BLOCK 3000 of the nonvolatile memory NONVOLATILE MEMORY1, and the encrypted write data ENC_WDATA may be divided (i.e., ENC_WDATA1, ENC_WDATA2, ENC_WDATA3 and ENC_WDATA4) and programmed in a first to fourth pages having PPNs of 0 to 3 of the fourth block BLOCK 4000 of the nonvolatile memory NONVOLATILE MEMORY2. Thus, in the program process described above with reference to FIG. 5, the first encrypted security key 1ST ENC_SEC_KEY and the second security key 2ND SEC_KEY may be programmed in another region at a predetermined distance from a region on the memory device 430 in which the encrypted write data ENC_WDATA is programmed. As will be described below, the memory controller according to example embodiments may manage the first encrypted security key 1ST ENC_SEC_KEY and the second security key 2ND SEC_KEY separately from the encrypted write data ENC_WDATA. Therefore, the memory controller may erase or change only the first encrypted security key 1ST ENC_SEC_KEY and the second security key 2ND SEC_KEY separately from the encrypted write data ENC_WDATA. In some example embodiments, the first encrypted security key 1ST ENC_SEC_KEY and the second security key 2ND SEC_KEY may be programmed in a region separated by a distance of at least one page or more on the memory device 430 from the encrypted write data ENC_WDATA. Also, the erase process of the memory device 430 may be performed in units of blocks, and the first encrypted security key 1ST ENC_SEC_KEY and the second security key 2ND SEC_KEY may be programmed in a region separated by a distance of at least one block or more on the memory device 430 from the encrypted write data ENC_WDATA.

Figure 8:
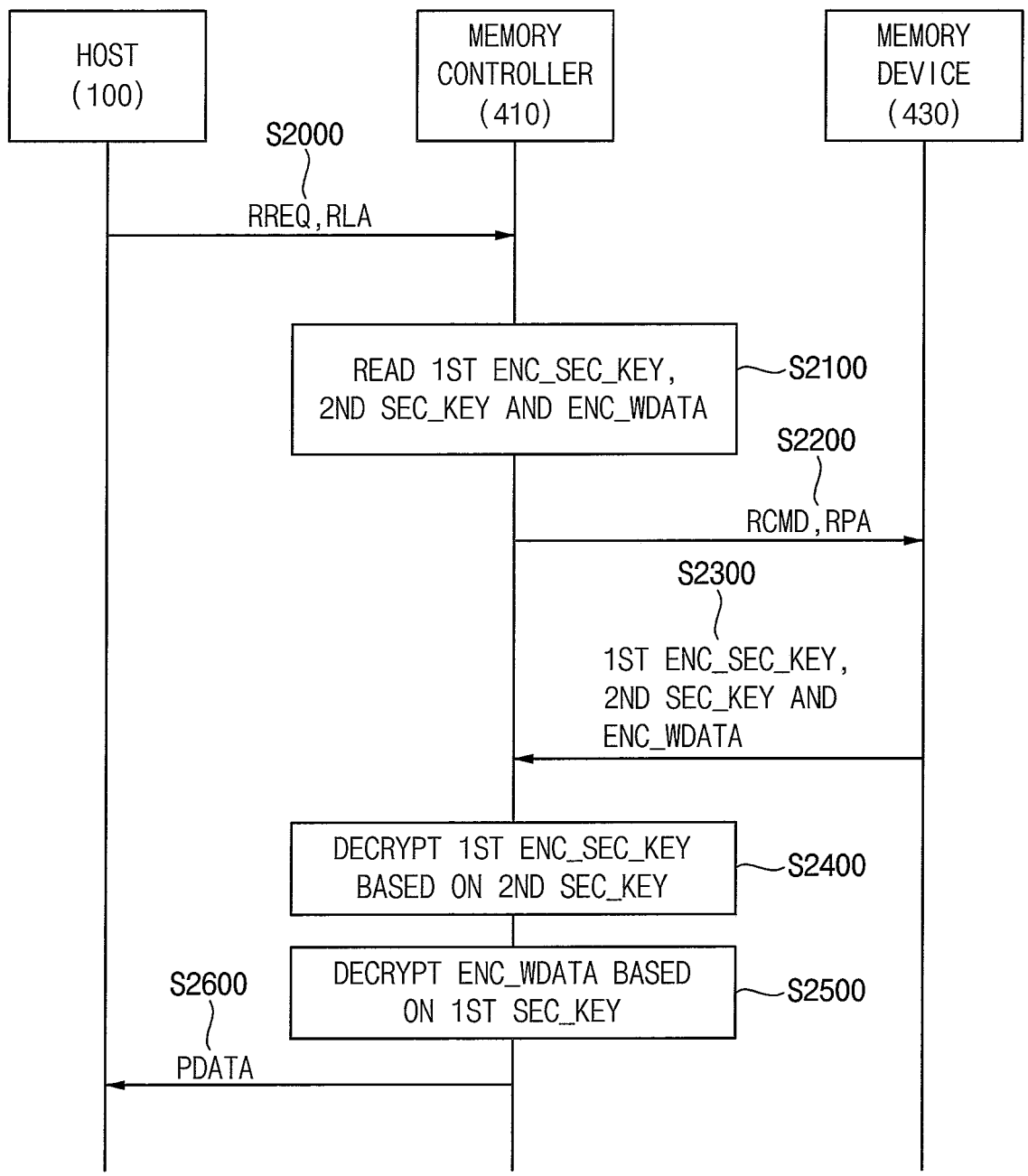
FIG. 8 is a diagram illustrating a process of reading data from a nonvolatile memory illustrated in FIG. 1.

FIG. 8 is a diagram illustrating a process of reading data from a nonvolatile memory illustrated in FIG. 1.

Referring to FIG. 8, the host 100 may provide a read request RREQ and a read logical address RLA corresponding to the read request RREQ to the memory controller 410 (S2000). The memory controller 410 may read the first encrypted security key 1ST ENC_SEC_KEY, the second security key 2ND SEC_KEY, and the encrypted write data ENC_WDATA (S2100). In some example embodiments, the address mapping table described above with reference to FIG. 5 may be used to perform operation S2100.

The memory controller 410 may generate a read command RCMD and a read physical address RPA based on the read request RREQ and the read logical address RLA, and provide the read command RCMD and the read physical address RPA to the memory device 430 (S2200). The memory device 430 may provide the first encrypted security key 1ST ENC_SEC_KEY, the second security key 2ND SEC_KEY, and the encrypted write data ENC_WDATA to the memory controller 410 (S2300).

The memory controller 410 may decrypt the first encrypted security key 1ST ENC_SEC_KEY based on the second security key 2ND SEC_KEY (S2400). In some example embodiments, the first security key 1ST SEC_KEY may be generated as a result of performing operation S2400.

The memory controller 410 may decrypt the encrypted write data ENC_WDATA based on the first security key 1ST SEC_KEY (S2500). In some example embodiments, the write data WDATA may be generated as a result of performing operation S2500.

The memory controller 410 may provide the write data WDATA to the host 100 (S2600).

Figure 9:
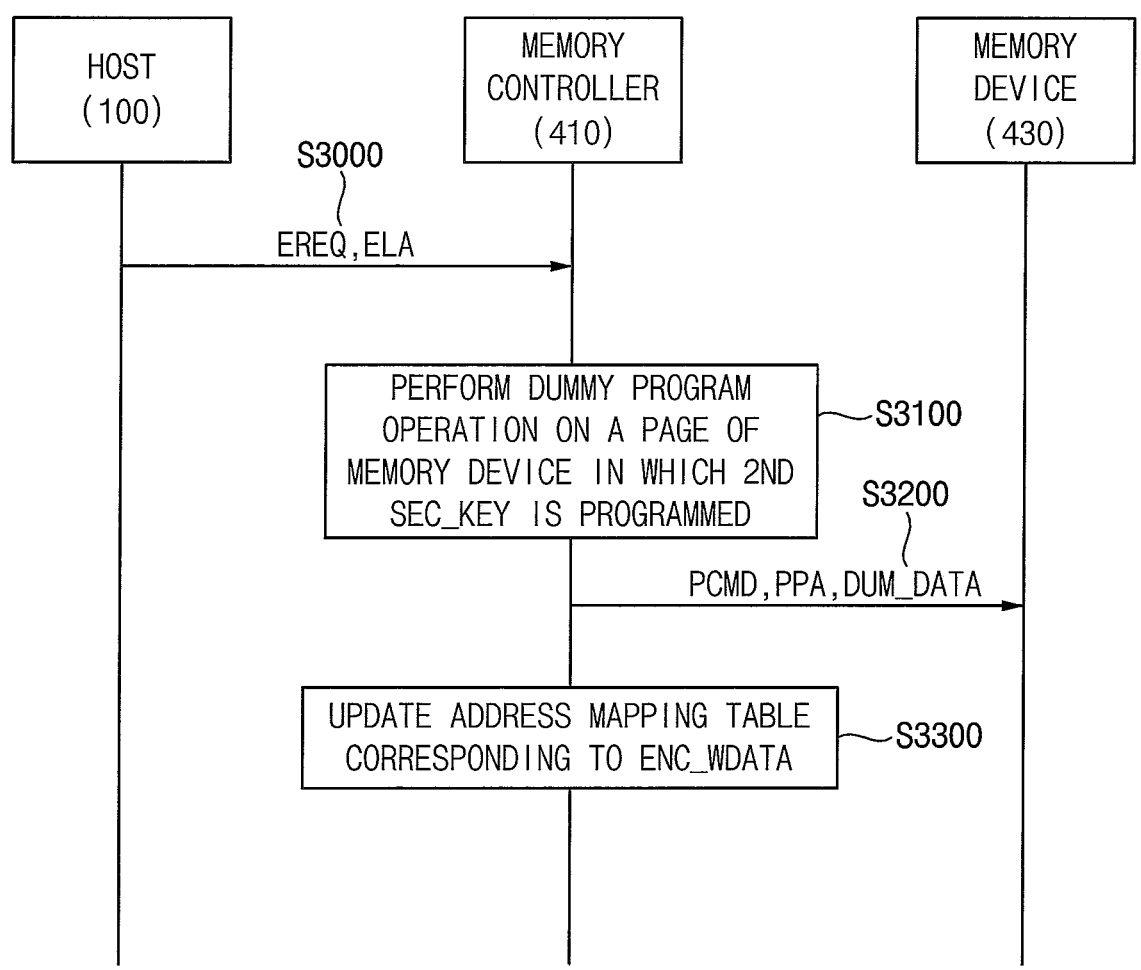
FIG. 9 is a diagram for describing a process of erasing data stored in a nonvolatile memory illustrated in FIG. 1.

FIG. 9 is a diagram for describing a process of erasing data stored in a nonvolatile memory illustrated in FIG. 1.

Referring to FIG. 9, the host 100 may provide an erase request EREQ and an erase logical address ELA corresponding to the erase request EREQ to the memory controller 410 (S3000). The memory controller 410 may perform a dummy program operation on a page of the memory device 430 in which the second security key 2ND SEC_KEY is programmed (S3100). In general, to reprogram other data to a previously programmed region of the memory device 430, an erase process for corresponding region should be first performed. Thus, over-programming or over-writing in the memory device 430 may be prohibited. The dummy program operation is a concept distinguished from the over-programming or the over-writing, and refers to invalidating data at the corresponding region by intentionally programming a dummy data DUM_DATA at the region on the memory device 430 that is already programmed. Since the program process in the memory device 430 is performed in units of pages, a region on the memory device 430 in which the dummy program operation is performed becomes an invalid page. Hereinafter, this will be described in more detail.

Figure 10A:
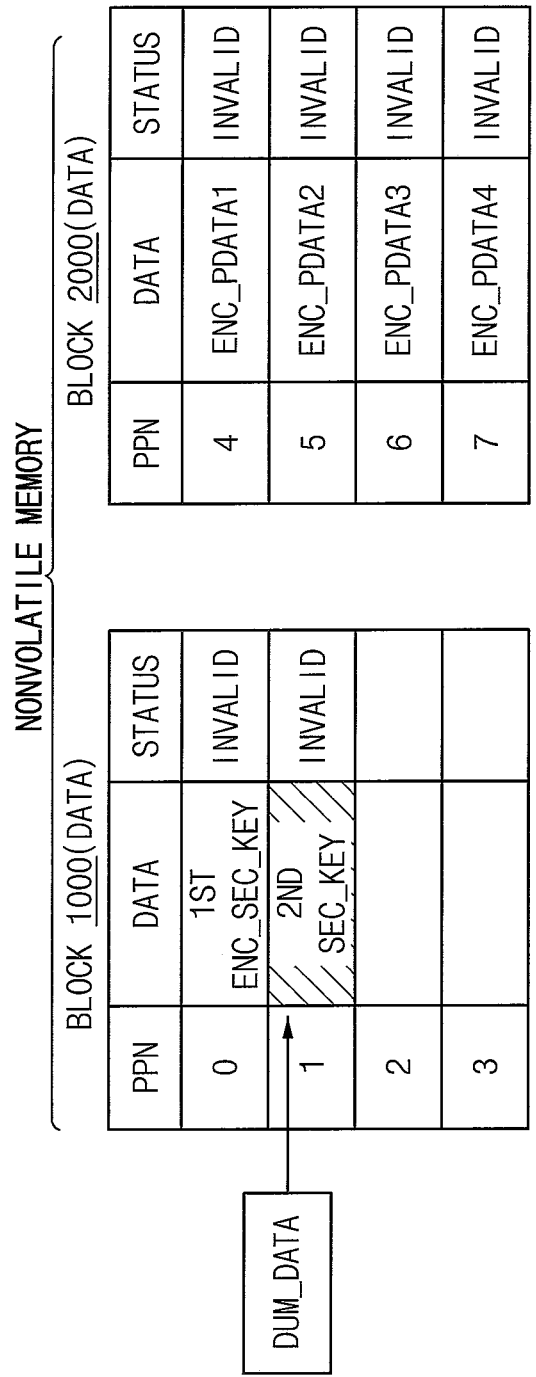
FIGS. 10A and 10B are diagrams for describing a process of erasing a write encrypted data, a first encrypted security key and a second security key illustrated in FIGS. 7A and 7B.
Figure 10B:
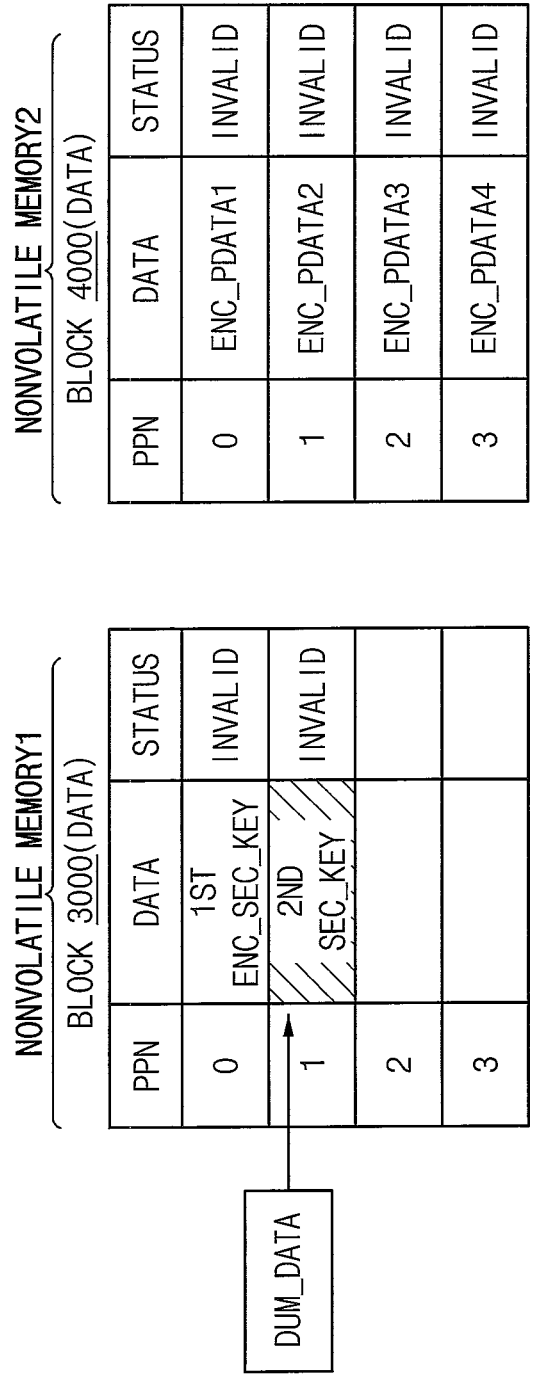

FIGS. 10A and 10B are diagrams for describing a process of erasing a write encrypted data, a first encrypted security key and a second security key illustrated in FIGS. 7A and 7B.

In FIG. 10A, blocks, i.e., a first block BLOCK 1000 and a second block BLOCK 2000, which are different regions of one nonvolatile memory NONVOLATILE MEMORY, are illustrated. The nonvolatile memory of FIG. 10A corresponds to the nonvolatile memory of FIG. 7A.

Referring to FIG. 10A, the dummy data DUM_DATA is programmed in the second page having a PPN of 1 of the first block BLOCK 1000 in which the second security key 2ND SEC_KEY is programmed. In some example embodiments, as a result of the program process, the second page having a PPN of 1 may be invalid, the security key 2ND SEC_KEY programmed in the second page having a PPN of 1 of the first block BLOCK 1000 may no longer be read effectively. Meanwhile, the first encrypted security key 1ST ENC_SEC_KEY was encrypted based on the second security key 2ND SEC_KEY, and the encrypted write data ENC_WDATA was encrypted based on the first security key 1ST SEC_KEY. Therefore, as long as the second security key 2ND SEC_KEY cannot be read effectively by the dummy program operation, the first security key 1ST SEC_KEY and the encrypted write data ENC_WDATA also cannot be read effectively. Thus, the first page having a PPN of 0 of the first block BLOCK 1000 in which the first security key 1ST SEC_KEY is programmed and the third to sixth pages having PPNs of 4 to 6 of the second block BLOCK 2000 in which the encrypted write data ENC_WDATA is programmed may also be invalidated.

In FIG. 10B, blocks, i.e., a third block BLOCK 3000 and a fourth block BLOCK 4000, which are same regions of each of different nonvolatile memories NONVOLATILE MEMORY1 and NONVOLATILE MEMORY2 are illustrated. The nonvolatile memory of FIG. 10B corresponds to the nonvolatile memory of FIG. 7B.

Referring to FIG. 10B, the dummy data DUM_DATA is programmed in the second page having a PPN of 1 of the third block BLOCK 3000 of the nonvolatile memory NONVOLATILE MEMORY1 in which the second security key 2ND SEC_KEY is programmed. As described above with reference to FIG. 10A, as a result of the program process, the second security key 2ND SEC_KEY may not be able to be read effectively, and the first security key 1ST SEC_KEY and the encrypted write data ENC_WDATA also may not be able to be read effectively.

Referring back to FIG. 9, the memory controller 410 may provide a program command PCMD, a program physical address PPA, and a dummy data DUM_DATA based on an erase request EREQ and an erase logical address ELA to the memory device 430 (S3200).

The memory controller 410 may update the address mapping table corresponding to the encrypted write data ENC_WDATA (S3300).

Figure 11:
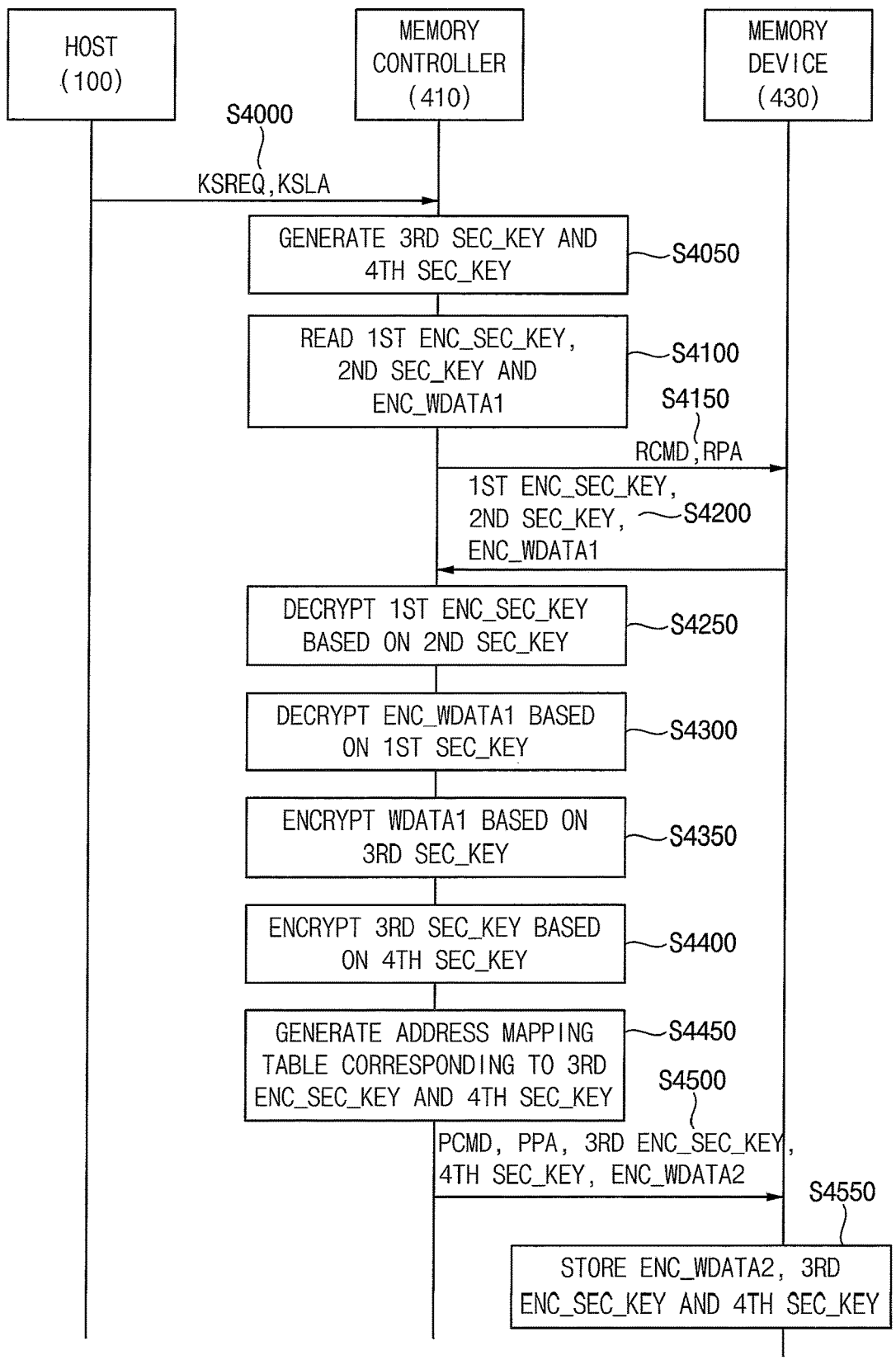
FIG. 11 is a diagram for describing a process of managing security keys used in a process of encrypting write data.

FIG. 11 is a diagram for describing a process of managing security keys used in a process of encrypting write data.

Referring to FIG. 11, the host 100 may provide a key switching request KSREQ and a key switching logical address KSLA corresponding to the key switching request KSREQ to the memory controller 410 (S4000). In some example embodiments, the key switching request KSREQ may be a request to change only security keys corresponding to the encrypted write data ENC_WDATA while maintaining the encrypted write data ENC_WDATA without deleting or changing the encrypted write data ENC_WDATA.

The memory controller 410 may generate a third security key 3RD SEC_KEY and a fourth security key 4TH SEC_KEY (S4050), and read the first encrypted security key 1ST ENC_SEC_KEY, the second security key 2ND SEC_KEY, and the encrypted write data ENC_WDATA1 (S4100). The memory controller 410 may generate a read command RCMD and a read physical address RPA based on the key switching request KSREQ and the key switching logical address KSLA, and provide the read command RCMD and the read physical address RPA to the memory device 430 (S4150). The memory device 430 may provide a first encrypted security key 1ST ENC_SEC_KEY, a second security key 2ND SEC_KEY, and the encrypted write data ENC_WDATA1 to the memory controller 410 (S4200).

The memory controller 410 may decrypt the first encrypted security key 1ST ENC_SEC_KEY based on the second security key 2ND SEC_KEY (S4250) to generate the first security key 1ST SEC_KEY, and decrypt the encrypted write data ENC_WDATA1 based on the first security key 1ST SEC_KEY to generate the write data WDATA1 (S4300).

The memory controller 410 may encrypt the write data WDATA1 based on the third security key 3RD SEC_KEY (S4350) to generate encrypted write data ENC_WDATA2, and encrypt the third security key 3RD SEC_KEY based on the fourth security key 4TH SEC_KEY to generate third encrypted security key 3RD ENC_SEC_KEY (S4400).

The memory controller 410 may generate an address mapping table corresponding to the third encrypted security key 3RD ENC_SEC_KEY and the fourth security key 4TH SEC_KEY (S4450).

The memory controller 410 may provide a program command PCMD, a program physical address PPA, the third encrypted security key 3RD ENC_SEC_KEY, the fourth security key, and the encrypted write data ENC_WDATA2 to the memory device 430 based on the key switching request KSREQ and the key switching logical address KSLA (S4500).

The memory device 430 may store the encrypted write data ENC_WDATA2, the third encrypted security key 3RD ENC_SEC_KEY, and the fourth security key 4TH SEC_KEY (S4550).

Figure 12:
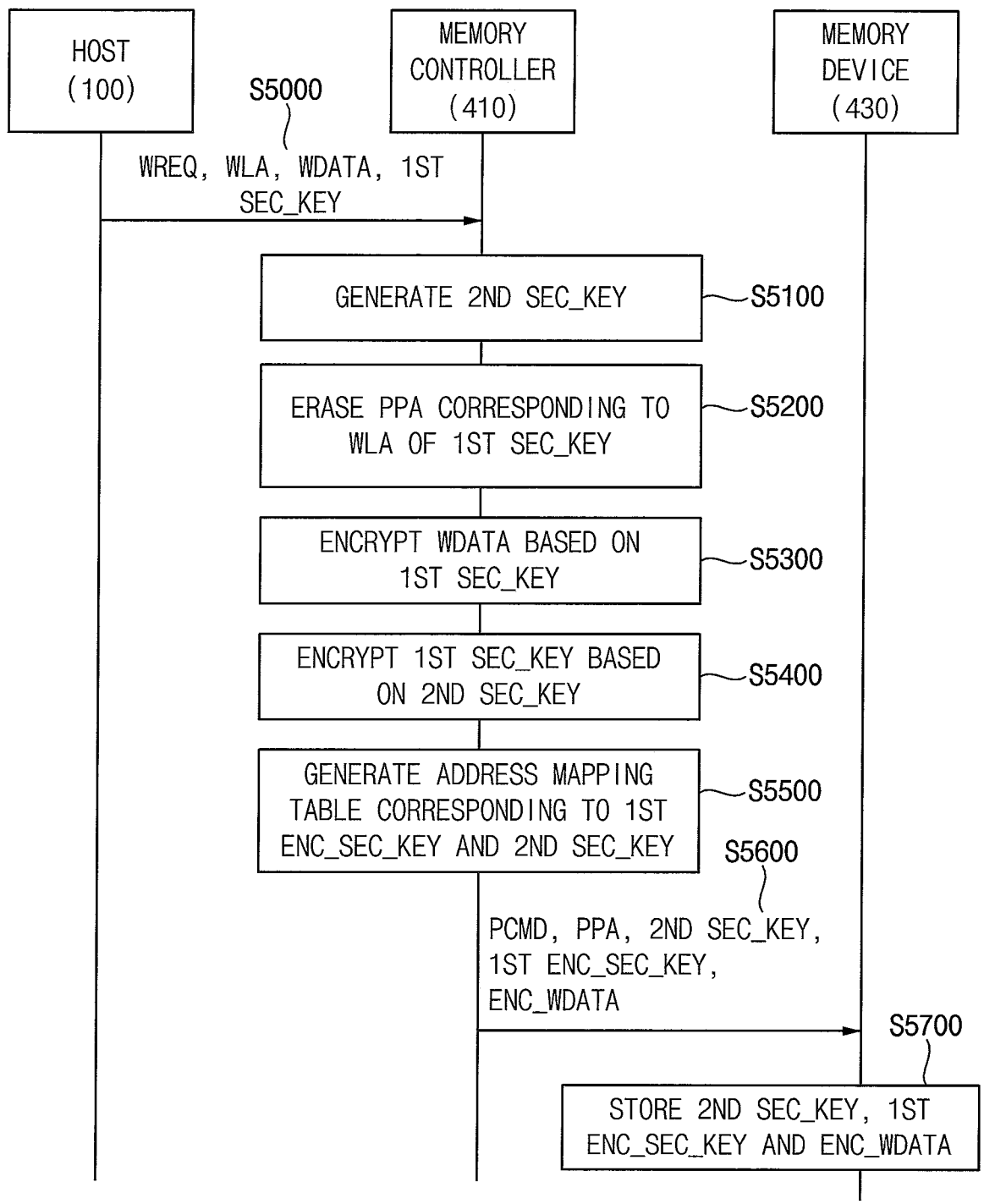
FIG. 12 is a diagram for describing a process of programming data in a nonvolatile memory illustrated in FIG. 1.

FIG. 12 is a diagram for describing a process of programming data in a nonvolatile memory illustrated in FIG. 1.

In FIG. 12, the memory device 430 may be a self-encrypting device (SED).

Referring to FIG. 12, the host 100 may provide a write request WREQ, a write logical address WLA corresponding to the write request WREQ, write data WDATA, and a first security key 1ST SEC_KEY to the memory controller 410. In some example embodiments, when the memory device 430 is the self-encrypting device, the host 100 may generate the first security key 1ST SEC_KEY by itself and provide the first security key 1ST SEC_KEY to the memory controller 410.

The memory controller 410 may generate a second security key 2ND SEC_KEY (S5100). The memory controller 410 may erase a program physical address PPA corresponding to the write logical address WLA of the first security key 1ST SEC_KEY (S5200). In some example embodiments, in consideration of the characteristic that the first security key 1ST SEC_KEY is provided from the host 100 when the memory device 430 is the self-encrypting device, a program physical address PPA corresponding to the first security key 1ST SEC_KEY that may exist in the address mapping table may be erased.

The memory controller 410 may encrypt the write data WDATA based on the first security key 1ST SEC_KEY (S5300) to generate encrypted write data ENC_WDATA, and encrypt the first security key 1ST SEC_KEY based on the second security key 2ND SEC_KEY (S5400) to generate a first encrypted security key 1ST ENC_SEC_KEY.

The memory controller 410 may generate a program command PCMD and a program physical address PPA based on the write request WREQ and the write logical address WLA.

The memory controller 410 may provide the program command PCMD, the program physical address PPA, the second security key 2ND SEC_KEY, the first encrypted security key 1ST ENC_SEC_KEY, and the encrypted write data ENC_WDATA to the memory device 430 (S5600). The memory device 430 may store the second security key 2ND SEC_KEY, the first encrypted security key 1ST ENC_SEC_KEY, and the encrypted write data ENC_WDATA based on the program physical address PPA (S5700).

FIG. 13. is a diagram for describing commands generated by a memory controller of FIG. 1 in response to requests from a host illustrated in FIG. 1.

In FIG. 13, requests WREQ, RREQ, EREQ, and KSREQ provided by the host 100 and commands PCMD and RCMD provided by the memory controller 410 are illustrated. The requests WREQ, RREQ, EREQ, and KSREQ and the commands PCMD and RCMD may be requests provided by the host 100 and commands provided by the memory controller 410 in the programming process, the reading process, the erasing process, and the security key managing process described above with reference to FIGS. 5, 8, 9, 11, and 12.

Referring to FIG. 13, in response to a read request RREQ from the host 100, the memory controller 410 may generate a read command RCMD and provide the read command RCMD to the memory device 430.

In response to a write request or an erase request EREQ from the host 100, the memory controller 410 may generate a program command PCMD and provide the program command PCMD to the memory device 430.

In response to a key switching request KSREQ from the host 100, the memory controller 410 may generate a read command RCMD and a program command PCMD, and provide the read command RCMD and the program command PCMD to the memory device 430.

Thus, when the host 100 provides an erase request EREQ, the memory controller 410 according to example embodiments may generate a program command PCMD instead of an erase command.

Figure 14:
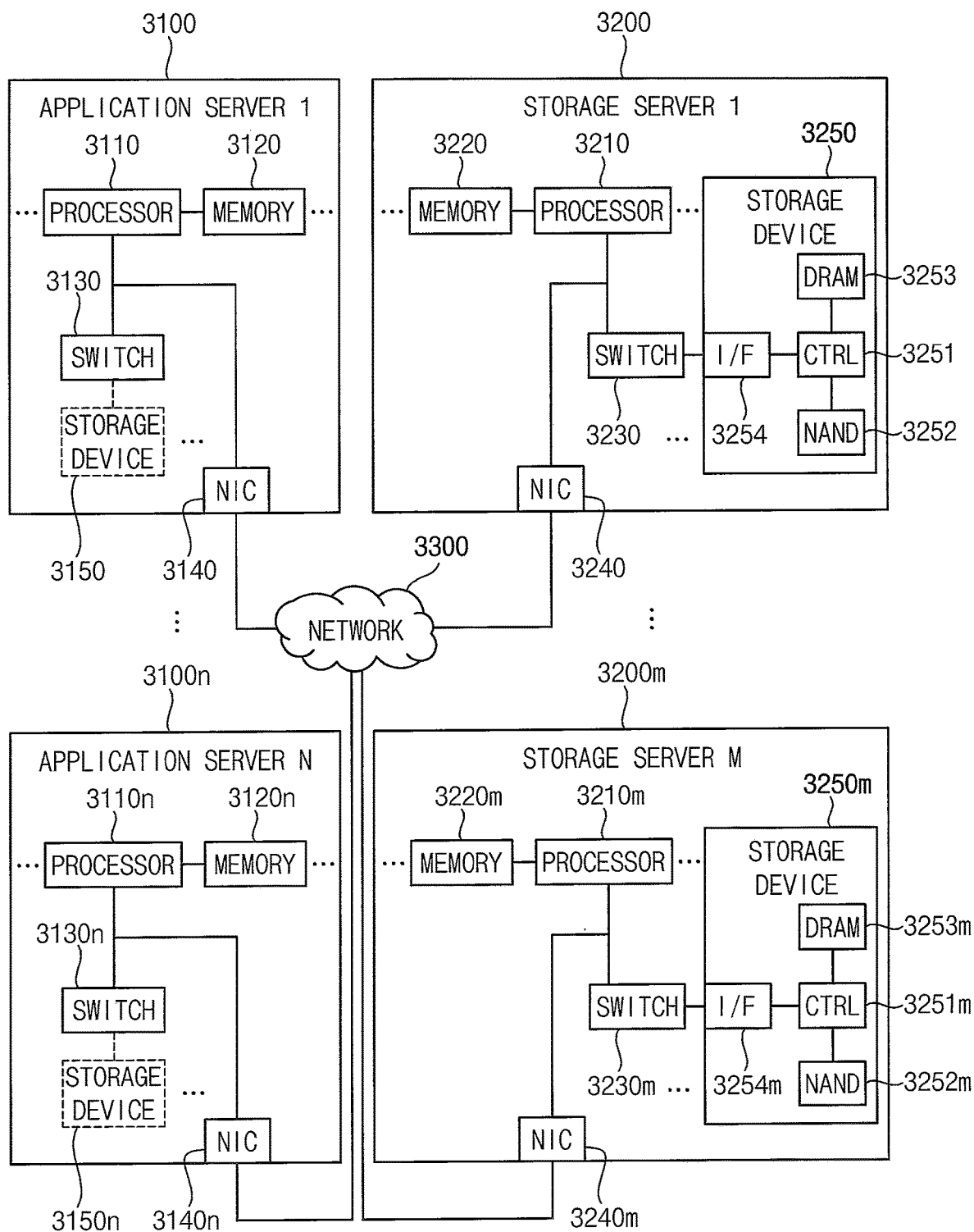
FIG. 14 is a block diagram illustrating a data center to which a memory system according to example embodiments is applied.

FIG. 14 is a block diagram illustrating a data center to which a memory system according to example embodiments is applied.

Referring to FIG. 14, a data center 3010 may be a facility that collects various types of data and provides various services, and may be referred to as a data storage center. The data center 3010 may be a system for operating search engines and databases, and may be a computing system used by companies such as banks or government agencies. The data center 3010 may include application servers 3100 to 3100$n$ and storage servers 3200 to 3200$m$. The number of the application servers 3100 to 3100$n$ and the number of the storage servers 3200 to 3200$m$ may be variously selected according to example embodiments, and the number of the application servers 3100 to 3100$n$ and the number of the storage servers 3200 to 3200$m$ may be different from each other.

The application server 3100 may include at least one processor 3110 and at least one memory 3120. The storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100$n$ and the storage servers 3200 to 3200$m$ may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200$m$ may be provided as file storages, block storages, or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other embodiments, the network 3300 may be a general or normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data (e.g., data requested to be stored by a user or a client) into one of the storage servers 3200 to 3200m through the network 3300. In addition, the application server 3100 may obtain data (e.g., data requested to be read by the user or the client) from one of the storage servers 3200 to 3200m through the network 3300. The application server 3100 may be implemented as, e.g., a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 may provide a physical connection between the processor 3210 and a controller 3251, and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230, and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data from an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252. The storage device 3250 may include a connector (CN) 3255 and may be implemented in the form of the module-type storage device having capacity scalability.

The storage devices 3150 to 3150m and 3250 to 3250m may be implemented based on the storage system and the method according to example embodiments described with reference to FIGS. 1 through 17.

The storage devices 3150 to 3150m and 3250 to 3250m may be implemented based on the memory device including the memory controller described above with reference to FIGS. 1, 2, 5, 8, 9, 11, and 12.

As described above, in a memory controller, a memory system including the memory controller, and a method of operating the memory controller, when a host issues an erase request for data encrypted and programmed in a memory device, only a portion of security keys used to encrypt the data may be erased to invalidate the data. Accordingly, in a memory device implemented as nonvolatile memories, a burden due to a limited number of program-erase (PE) cycle may be reduced, and a time used for erasing the data may be reduced. Further, security keys used to encrypt the data may be stored and managed separately from the data such that the security keys may be efficiently changed or erased.

Embodiments may be applied to various electronic devices and systems that include the memory controller and the memory system. For example, embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

By way of summation and review, an encryption of data may be performed to enhance security of data stored in memory devices. A security key may be used in the encryption process, and the security key may be stored in the memory devices together with the encrypted data. In general, when managing the encrypted data and the security key, characteristics of the memory devices may be considered. The memory devices have excellent stability, a fast access speed for programmed data, and low power consumption, but a number of program-erase (PE) cycles may be limited. A read operation and a program operation for the memory device may be performed in units of pages, but an erase operation is performed in units of blocks.

As described above, some example embodiments may provide a memory controller, a memory system including the memory controller, and a method of operating the memory controller that may reduce a burden due to a limited number of program-erase (PE) cycle and a time used for erasing data.

In a memory controller, a memory system including the memory controller, and a method of operating the memory controller, when a host issues an erase request for data encrypted and programmed in a memory device, only a portion of security keys used to encrypt the data may be erased to invalidate the data. Accordingly, in a memory device implemented as nonvolatile memories, a burden due to a limited number of program-erase (PE) cycles may be reduced, and a time used for erasing the data may be reduced. Further, security keys used to encrypt the data may be stored and managed separately from the data such that the security keys may be efficiently changed or erased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory controller, comprising:
a key generator configured to generate a first security key and a second security key based on a write request from a host;
an encryption and decryption circuit configured to encrypt write data corresponding to the write request based on the first security key to generate encrypted write data, and configured to encrypt the first security key based on the second security key to generate a first encrypted security key; and
a processor,
wherein the processor is configured to control a nonvolatile memory to program the encrypted write data, the first encrypted security key, and the second security key in the same nonvolatile memory, the first encrypted security key being programmed in a first page of the nonvolatile memory, the second security key being programmed in a second page of the nonvolatile memory, and the encrypted write data being programmed in a block of the nonvolatile memory that is different from a block storing the first encrypted security key and the second security key,
wherein the processor is configured to, in response to an erase request for the encrypted write data from the host, control the nonvolatile memory to perform a dummy program operation on the second page in which the second security key is programmed instead of erasing the encrypted write data,
wherein the processor is configured to, in response to a key switching request from the host which includes a key switching logical address corresponding to the key switching request, control the nonvolatile memory to change both the first security key and the second security key to a third security key and a fourth security key, respectively, and
wherein the processor is configured to, in response to the key switching request from the host which includes the key switching logical address, decrypt the first encrypted security key using the second security key to generate the first security key, decrypt the encrypted write data using the first security key to generate the write data, encrypt the write data using the third security key to generate encrypted write data, and encrypt the third security key using the fourth security key to generate a third encrypted security key.

2. The memory controller as claimed in claim 1, wherein the processor is configured to provide a read command to the nonvolatile memory in response to a read request from the host, and configured to provide a program command to the nonvolatile memory in response to the write request or the erase request from the host.

3. The memory controller as claimed in claim 1, wherein:
the processor is configured to read the encrypted write data, the first encrypted security key, and the second security key in response to a read request from the host, and
the encryption and decryption circuit is configured to decrypt the first encrypted security key based on the second security key to generate the first security key, and configured to decrypt the encrypted write data based on the first security key to generate the write data.

4. The memory controller as claimed in claim 1, wherein the processor is configured to provide a read command and a program command to the nonvolatile memory in response to the key switching request from the host.

5. The memory controller as claimed in claim 4, wherein the processor is configured to control the nonvolatile memory to program the new encrypted write data, the third encrypted security key, and the fourth security key in the nonvolatile memory.

6. The memory controller as claimed in claim 1, wherein the processor is configured to generate an address mapping table corresponding to the first encrypted security key and the second security key in response to the write request from the host.

7. The memory controller as claimed in claim 1, wherein the processor is configured to update an address mapping table corresponding to the encrypted write data in response to on the erase request from the host.

8. A memory system, comprising:
a plurality of nonvolatile memories including a plurality of memory blocks; and
a memory controller configured to control operations of the plurality of nonvolatile memories, the memory controller including:
a key generator configured to generate a first security key and a second security key in response to a write request from a host;
an encryption and decryption circuit configured to encrypt write data corresponding to the write request based on the first security key to generate encrypted write data, and configured to encrypt the first security key based on the second security key to generate a first encrypted security key; and
a processor,
wherein the processor is configured to control a nonvolatile memory such that the encrypted write data, the first encrypted security key, and the second security key are programmed in the same nonvolatile memory, the first encrypted security key being programmed in a first page of the nonvolatile memory, the second security key being programmed in a second page of the nonvolatile memory, and the encrypted write data being programmed in a block of the nonvolatile memory that is different from a block storing the first encrypted security key and the second security key,
wherein the processor is configured to, in response to an erase request for the encrypted write data from the host, control the nonvolatile memory to perform a dummy program operation on the second page in which the second security key is programmed instead of erasing the encrypted write data,
wherein the processor is configured to, in response to a key switching request from the host which includes a key switching logical address corresponding to the key switching request, control the nonvolatile memory to change both the first security key and the second security key to a third security key and a fourth security key, respectively, and
wherein the processor is configured to, in response to the key switching request from the host which includes the key switching logical address, decrypt the first encrypted security key using the second security key to generate the first security key, decrypt the encrypted write data using the first security key to generate the write data, encrypt the write data using the third security key to generate encrypted write data, and encrypt the third security key using the fourth security key to generate a third encrypted security key.

9. The memory system as claimed in claim 8, wherein the processor is configured to provide a read command to the nonvolatile memory in response to a read request from the host, and configured to provide a program command to the nonvolatile memory in response to the write request or the erase request from the host.

10. The memory system as claimed in claim 8, wherein:
the processor is configured to read the encrypted write data, the first encrypted security key, and the second security key in response to a read request from the host, and
the encryption and decryption circuit is configured to decrypt the first encrypted security key based on the second security key to generate the first security key, and configured to decrypt the encrypted write data based on the first security key to generate the write data.

11. The memory system as claimed in claim 8, wherein the processor is configured to provide a read command and a program command to the nonvolatile memory in response to the key switching request from the host.

12. The memory system as claimed in claim 11, wherein the processor is configured to control the nonvolatile memory to program the new encrypted write data, the third encrypted security key, and the fourth security key in the nonvolatile memory.

13. The memory system as claimed in claim 8, wherein the processor is configured to generate an address mapping table corresponding to the first encrypted security key and the second security key in response to the write request from the host.

14. The memory system as claimed in claim 8, wherein the processor is configured to update an address mapping table corresponding to the encrypted write data in response to the erase request from the host.

15. A method of operating a memory system including a memory controller and a nonvolatile memory, the method comprising:
receiving, by the memory controller, a write request from a host;
generating, by the memory controller, a first security key and a second security key;
encrypting, by the memory controller, write data corresponding to the write request based on the first security key to generate encrypted write data,
encrypting, by the memory controller, the first security key based on the second security key to generate a first encrypted security key;
programming the encrypted write data in the plurality of nonvolatile memories, and programming the first encrypted security key and the second security key in the same nonvolatile memory, the first encrypted security key being programmed in a first page of the nonvolatile memory, the second security key being programmed in a second page of the nonvolatile memory, and the encrypted write data being programmed in a block of the nonvolatile memory that is different from a block storing the first encrypted security key and the second security key;
in response to an erase request for the encrypted write data from the host, performing a dummy program operation on the second page in which the second security key is programmed instead of erasing the encrypted write data;

in response to a key switching request from the host which includes a key switching local address corresponding to the key switching request, changing both the first security key and the second security key to a third security key and a fourth security key, respectively, and in response to the key switching request from the host which includes the key switching logical address, decrypt the first encrypted security key using the second security key to generate the first security key, decrypt the encrypted write data using the first security key to generate the write data, encrypt the write data using the third security key to generate encrypted write data, and encrypt the third security key using the fourth security key to generate a third encrypted security key.

* * * * *